Patented Dec. 25, 1951

2,580,288

UNITED STATES PATENT OFFICE 2,580,288

ANTICORROSION COMPOSITIONS

Morton Fainman, Chicago, Ill., assignor to Standard Oil Company, Chicago, Ill., a corporation of Indiana No Drawing. Application September 28, 1948, Serial No. 51,643

7 Claims. (Cl. 252—49.6)

This invention relates to compositions possessing corrosion and/or rust preventive properties. More particularly, the present invention relates to organic compositions, particularly oleaginous compositions which prevent or inhibit corrosion and/or rusting, especially in systems employing water or steam or which may be contaminated with water or steam.

In various equipment in which water and/or steam is used, or which may become contaminated with water or steam during service or storage, corrosion and/or rusting of the metal parts, particularly the ferrous metal parts, is encountered causing material damage to such equipment, for example, in the operation of steam turbines, rusting or corrosion of the metal parts of such systems is a serious problem, and hence, prevention or inhibition of such corrosion or rusting is highly important. Similar problems exist in the lubrication of certain types of marine engines.

The present invention is also applicable to anti-rust or slushing compositions for the protection of metals against atmospheric corrosion and/or rusting. Such anti-rust or slushing compositions are applied to metallic articles to be stored or for shipment to prevent rusting and/or corrosion thereof. Similarly, fabricated metallic articles and finished or semi-finished metal stocks destined for shipment by rail or by water are protected against attack by moisture by coating such materials with anti-rust or slushing compositions.

Accordingly, it is an object of the present invention to provide a composition which will effectively inhibit or prevent the rusting and/or corrosion of metallic surfaces.

Another object of the invention is to provide a composition which will effectively inhibit or prevent the rusting and/or corrosion of metallic surfaces which come in contact with water and/or steam.

A further object of the invention is to provide a turbine oil which will effectively inhibit the rusting and corrosion of the metal surfaces of the system which come in contact with water or steam. Still another object of the invention is to provide a lubricant composition which will effectively inhibit or prevent the corrosion and/or rusting of metal surfaces of equipment employing such lubricant, particularly in equipment in which steam or water may be present.

Still another object of the invention is to provide a slushing composition which will prevent or inhibit the rusting and/or corrosion of metal surfaces.

I have discovered that the foregoing objects can be attained by incorporating in an organic composition comprising a major proportion, at least about 90% (weight), of an oleaginous material, a small amount, for example, from about 0.001% to about 5%, and preferably from about 0.005% to about 0.1% (by weight) of an aminosilane having the general formula $(RO)_xSiZ_{4-x}$, wherein RO represents hydroxy groups or alkoxy groups, at least one of which is an alkoxy group, preferably a monovalent tertiary alkoxy group, Z is a monovalent amino or a hydrolyzable nitrogen group, and $x$ is an integer, at least 1. The alkoxy group can contain from one to twenty or more carbon atoms, preferably from about three to about eighteen carbon atoms; the sum of the carbon atoms in the molecule being at least four. The silanes have at least one tertiary alkoxy group and at least one hydrolyzable nitrogen group attached to the same silicon atom.

The term "hydrolyzable nitrogen" as used herein refers to nitrogen which is liberated either in the form of ammonia, an amine or an equivalent amino compound or salt, on hydrolysis. Thus, the nitrogen may be present in the silane as

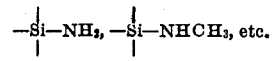

The aminosilanes can be compounded with an oleaginous material such as, by way of example, hydrocarbon oils, natural or synthetic, petroleum oils, vegetable oils, animal oils, marine oils, synthetic oils, such as monohydroxy 1,2 polypropylene monoethers, etc.

The aminosilanes are readily prepared from silicon tetrachloride and the desired alcohol or alcohols, and ammonia. For example, when it is desired that the alkoxy groups be tertiary the first step is the reaction of a selected tertiary alcohol with silicon tetrachloride in the presence of an acid acceptor, such as pyridine. The resultant tertiary alkoxy chlorosilane is then converted to the corresponding aminosilane by treatment with ammonia under controlled temperature conditions.

The preparation of the aminosilane is illustrated by the following example, for the preparation of ditertiary butoxydiaminosilane:

1050 parts of benzene and 510 parts of silicon tetrachloride were placed in a glass-lined reaction vessel, cooled to about 10° C. and 498 parts of pyridine slowly added while maintaining the temperature at below 20° C. The pyridine was added very slowly, requiring from about one to two hours. After the addition of the pyridine, the mixture was stirred for an additional fifteen minutes and 44 parts of butyl alcohol added in one dump. The temperature of the reaction mass was allowed to increase to about 40° C. to 45° C. and maintained at this temperature throughout the reaction, which requires from one to two hours. The mixture was then refluxed for about two hours, the reaction mass then cooled and filtered to remove the pyridine hydrochloride, which was formed. The filtrate and the benzene washings of the precipitate were combined and the benzene distilled off at atmospheric pressure. After all of the benzene was removed the product was cooled and the distillation continued at a reduced pressure, e. g., absolute pressure of 10 to 100 millimeters, to obtain ditertiary butoxydichlorosilane.

The aminosilane was then obtained by bubbling anhydrous ammonia into a benzene solution of the ditertiary butoxydichlorosilane, the mixture filtered and the filtrate distilled to obtain a liquid product boiling at 90° to 95° C. at 30 millimeters. This product was ditertiary butoxydiaminosilane. If desired, the aminosilane can be obtained by reacting the ditertiary butoxydichlorosilane with liquid ammonia under pressure.

Representative specific examples of aminosilanes useful for the present invention are the following: di(1-ethylcyclohexoxy) diaminosilane, dimethoxy - tertiary - butoxyaminosilane, normal butoxy-di-tertiary-butoxyaminosilane, tertiary-butoxyoctadecoxydiaminosilane, methoxy - tert-butoxydiaminosilane, ethoxy-tert-butoxydiaminosilane, isopropoxy - tert - butoxydiaminosilane, n-butoxy-tert-butoxydiaminosilane, sec-butoxy-tert-butoxydiaminosilane, di-tert-butoxydiaminosilane, di-tert-amoxy-diaminosilane, tri-tert-butoxy-aminosilane, methoxy di-tert-butoxyaminosilane, n-butoxy di-tert-butoxyaminosilane, isopropoxy-tert-butoxyaminosilane, and diisopropoxy-tert-butoxyaminosilane.

Although the aminosilanes described herein can be suitably employed in oleaginous compositions in general, particularly to inhibit or prevent rusting and/or corrosion, for the purpose of exemplifying the present invention the same will be described as applied to steam turbine lubricants for which highly refined oils having Saybolt Universal viscosities at 100° F. of from about 100 seconds to about 250 seconds are employed.

With the advent of drastic refining treatments to produce more highly refined turbine oils having improved non-sludging and emulsification properties, certain components of such oils, responsible for the wetting and therefore rust inhibiting properties of the oil are, however, removed. As a result, such oxidation-stable oils, produced by the drastic refining treatments, are inferior with respect to rust inhibiting qualities. Rusting steam turbine systems is usually encountered in the upper portions of the oil reservoirs and other parts of the systems by virtue of droplets of water coming in contact with the metallic surfaces and displacing any oil which may be present thereon. Oil will provide adequate protection against such rusting only if it wets the metal surfaces preferentially as compared with water. As the rusting in steam turbine systems progresses the iron oxides formed may scale off and be carried in suspension in the oil; often scoring bearings, plugging oil lines and frequently causing faulty operation of delicate governor parts. The need for non-rusting turbine oils is therefore great.

In accordance with one embodiment of the present invention the addition of small amounts of an aminosilane of the type herein described to turbine oils effectively inhibits rusting of the type above described. The rust inhibiting characteristic of turbine oils containing such additives is demonstrated by the following test:

Three hundred cubic centimeters of the oil to be tested are placed in a 400 cc. lipless glass beaker and heated to 140° F. in an oil bath and the oil stirred with a stirrer maintained at about 750 R. P. M. When the temperature of the oil sample reaches 140° F. a cleaned strip of cold rolled steel is suspended in the oil and stirring continued for 30 minutes to insure complete wetting of the steel specimen. Thirty cubic centimeters of distilled water are then carefully added by pouring it down the side of the beaker and stirring continued for forty-eight hours. At the end of this period the specimen is removed from the beaker, washed with naphtha and visually inspected for the presence of rust. The method of carrying out this test is fully described in the A. S. T. M. Manual of 1947, page 350, and identified as A. S. T. M. Method D665–47T.

Samples of a turbine oil base, namely a hydrocarbon oil having a Saybolt Universal viscosity at 100° F. of 150 seconds, and samples of this base oil containing small amounts of aminosilane were subjected to the above test and the following results obtained:

| Additive | Weight Per Cent | Degree of Rusting |
|---|---|---|
| None (Control) | | Extreme. |
| Di-tertiary-butoxydiaminosilane | 0.05 | None. |
| Octadecoxy-tertiary-butoxydiaminosilane | 0.1 | Slight. |

While the herein described aminosilanes are especially well adapted for use in turbine oil compositions they can be used in small proportions, namely up to about 5% in a wide variety of oleaginous bases, particularly as corrosion inhibitors. Illustrative of the media in which these additives can be employed are the following:

Motor fuels; for example, automobile or aviation gasolines, tractor fuels, diesel engine fuels, alcohol-containing motor fuels;

Lighting and heating fuels; kerosene stove oils, stove and lighting naphthas, furnace oils, fuels;

Solvent naphthas, cleaner naphthas, such as Stoddard solvent, V. M. and P. naphthas, hydroformed naphthas;

Lubricating and dielectric oils; motor oils, diesel oils, aviation engine oils, marine engine lubricants, gear oils, oil field machinery lubricants, ice-machine oils, steam cylinder lubricants, transmission oils, soluble oils, textile oils, cutting oils, turbine oils, insulating oils;

Lubricating greases; stable gel-like or solid dispersions of metal soaps in hydrocarbon oils;

Protective coatings; slushing oils and greases in which part or all of the hydrocarbon oil may be replaced by metal soaps, pitches, tars, asphalt, rosin, etc.

The compositions such as for example the hydrocarbon oil compositions in which the amino silanes are used, can in addition, contain V. I. improvers, viscosity-increasing agents, bloom producing agents, extreme pressure agents, antioxidants, dyes, and anti-knock agents, as the case may be, provided only that these additional agents do not enter into appreciable chemical reaction with the amino silanes or precipitate them from the oils to which they have been added.

Thus, in turbine oils, we can in addition to an amino silane, add an antioxidant such as the polyhydric phenols and their alkyl derivatives, for example, catechol, tertiary butyl catechol, octyl catechol, etc. Other effective antioxidants include beta-naphthol, amyl beta-naphthol, octyl beta-naphthol, lauryl beta-naphthol, alpha-naphthol, amyl alpha-naphthol, N-phenyl alphanaphthyl-amine, di-alpha-naphthyl-amine and the like. The antioxidant may suitably be used in a proportion in the range of about 0.001% to about 0.25% (by weight) based on the oil.

I claim:

1. A composition consisting essentially of a major proportion of a liquid oleaginous lubricating material, and from about 0.001% to about 5% of a dialkoxy diaminosilane in which the alkoxy groups contain from 1 to about 20 carbon atoms.

2. A composition consisting essentially of a major proportion of a mineral lubricating oil and from about 0.001% to about 5% of a dialkoxy diaminosilane in which the alkoxy groups contain from 1 to 20 carbon atoms.

3. A composition consisting essentially of a major proportion of a mineral lubricating oil and from about 0.001% to about 5% ditertiary butoxydiaminosilane.

4. A composition consisting essentially of a major proportion of a mineral lubricating oil and from about 0.001% to about 5% octadecoxy-t-butoxydiaminosilane.

5. A turbine oil comprising a major proportion of a hydrocarbon oil having a Saybolt Universal viscosity at 100° F. of from about 100 seconds to about 250 seconds, and from about 0.001% to about 5% of a dialkoxy diaminosilane in which the alkoxy groups contain from about 1 to about 20 carbon atoms.

6. A turbine oil composition as described in claim 2 wherein the alkoxy diaminosilane is octadecoxy-tertiary-butoxydiaminosilane.

7. A turbine oil comprising a major proportion of a hydrocarbon oil having a Saybolt Universal viscosity at 100° F. of from about 100 seconds to about 250 seconds, and from about 0.001% to about 5% di-tertiary-butoxy diaminosilane.

MORTON FAINMAN.

REFERENCES CITED

The following references are of record in the file of this patent:

UNITED STATES PATENTS

| Number | Name | Date |
|---|---|---|
| 2,053,474 | Graves | Sept. 8, 1936 |
| 2,426,121 | Rust | Aug. 19, 1947 |

OTHER REFERENCES

Industrial and Engineering Chemistry, "Tert-alkoxyaminosilanes" by Miner et al., vol. 39, No. 11, pages 1368–1371.

Industrial and Engineering Chemistry, August 1946, p. 17.

"Corrosion," Speller, McGraw-Hill, 1926, pages 139 and 140.